(12) United States Patent
Rockwell et al.

(10) Patent No.: US 6,599,350 B1
(45) Date of Patent: Jul. 29, 2003

(54) FILTRATION DEVICE FOR USE WITH A FUEL VAPOR RECOVERY SYSTEM

(75) Inventors: James Rockwell, Bellville, OH (US); Mason B. Mount, Mansfield, OH (US)

(73) Assignee: Hi-Stat Manufacturing Company, Inc., Sarasota, FL (US)

( * ) Notice: Subject to any disclaimer, the term of this patent is extended or adjusted under 35 U.S.C. 154(b) by 0 days.

(21) Appl. No.: 09/468,033

(22) Filed: Dec. 20, 1999

(51) Int. Cl.$^7$ ............................................. B01D 53/04
(52) U.S. Cl. .................. 96/135; 96/139; 96/141; 96/144; 96/152; 123/519; 55/337; 55/385.3; 55/418; 55/459.1; 55/424; 55/426
(58) Field of Search ................. 55/385.3, 337, 55/418, 459.1, 424, 426; 96/135, 136, 139, 140, 141, 142, 144, 147, 134, 152; 123/519

(56) References Cited

U.S. PATENT DOCUMENTS

| | | | |
|---|---|---|---|
| 2,983,384 A | * 5/1961 | Winslow | 55/337 |
| 3,834,126 A | 9/1974 | DiMinno, Jr. | |
| 3,853,518 A | 12/1974 | Tu et al. | |
| 4,058,380 A | 11/1977 | King, II | |
| 4,212,276 A | 7/1980 | Kaneda | |
| 4,338,106 A | 7/1982 | Mizuno et al. | |
| 4,486,206 A | 12/1984 | Miyakawa et al. | |
| 4,507,132 A | * 3/1985 | Yoshida | 96/139 |
| 4,750,923 A | 6/1988 | Haruta et al. | |
| 5,024,687 A | 6/1991 | Waller | |
| 5,047,072 A | * 9/1991 | Wertz et al. | 96/136 |
| 5,058,693 A | 10/1991 | Murdock | |
| 5,352,256 A | 10/1994 | Stead | |
| 5,478,379 A | * 12/1995 | Bevins | 96/135 |
| 5,538,543 A | * 7/1996 | Watanabe et al. | 96/139 |
| 5,622,544 A | * 4/1997 | Shamine et al. | 96/136 |
| 5,638,786 A | 6/1997 | Gimby | |
| 5,641,344 A | 6/1997 | Takahashi et al. | |
| 5,725,639 A | * 3/1998 | Khelifa et al. | 96/141 |
| 5,762,692 A | * 6/1998 | Dumas et al. | 96/141 |
| 5,765,538 A | 6/1998 | Krimmer et al. | |
| 5,776,227 A | * 7/1998 | Meiller et al. | 96/141 |
| 5,840,104 A | 11/1998 | Hashimoto et al. | |
| 5,878,728 A | 3/1999 | Kidokoro et al. | |
| 5,893,945 A | * 4/1999 | Hunsinger et al. | 96/135 |
| 5,910,637 A | * 6/1999 | Meiller et al. | 96/135 |
| 5,935,281 A | * 8/1999 | Rotheiser et al. | 55/385.3 |
| 6,042,628 A | * 3/2000 | Nishikiori et al. | 55/418 |
| 6,171,356 B1 | * 1/2001 | Twerdun | 55/418 |
| 6,228,151 B1 | * 5/2001 | Conrad et al. | 55/459.1 |

* cited by examiner

Primary Examiner—David Simmons
Assistant Examiner—Minh-Chau T. Pham
(74) Attorney, Agent, or Firm—Warn, Burgess & Hoffmann, P.C.

(57) ABSTRACT

A filtration device for use in filtering air used to purge a vapor storage canister used in connection with a fuel vapor recovery system of an automobile. The device includes a housing. In some instances, the housing may be integral to another component. The housing has a chamber having an arcuate inner surface. Air flowing into the chamber through an inlet port strikes the arcuate interior surface and is redirected such that the air rotates in said chamber. The centrifugal force of the rotating air filters out any contaminants of sufficient mass contained therein. The filtered air is removed via an outlet port positioned near the longitudinal-axis of the chamber. Contaminants removed from the air fall due to gravity or a secondary air flow pattern into a collection portion of the housing.

28 Claims, 3 Drawing Sheets

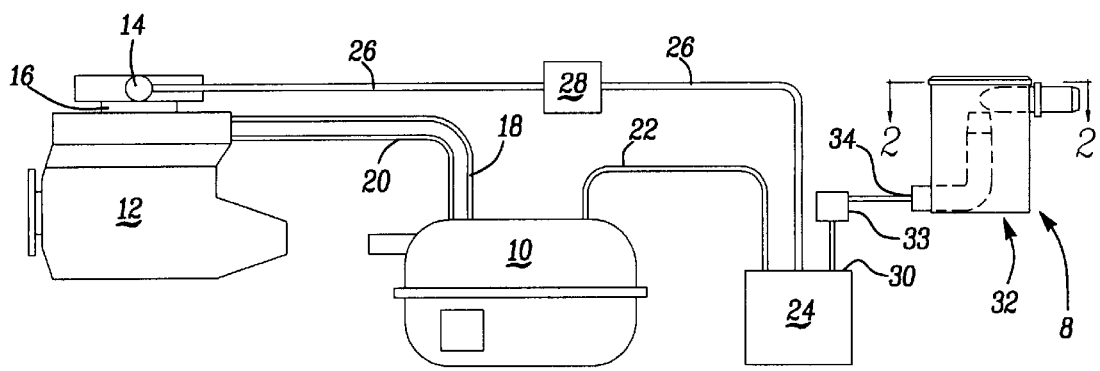
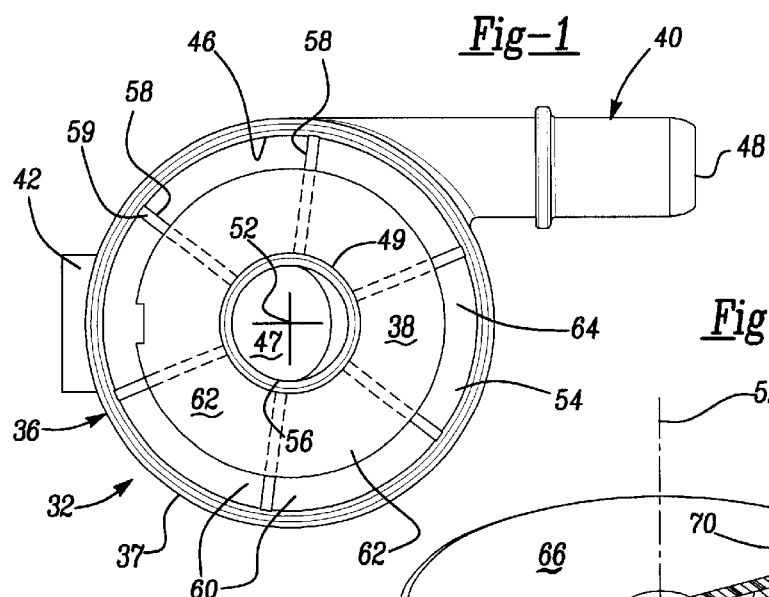
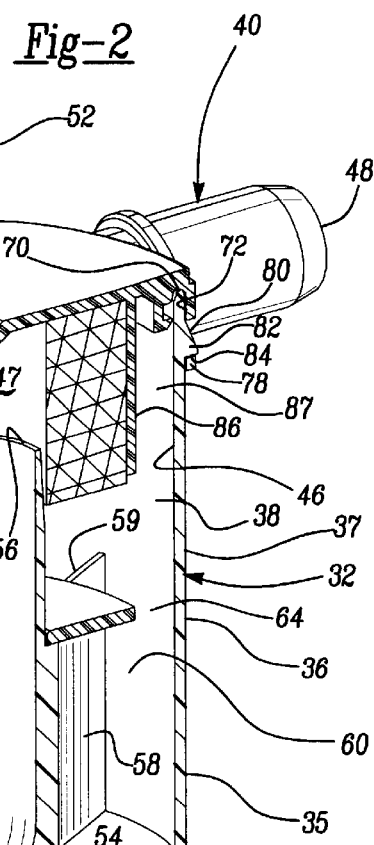

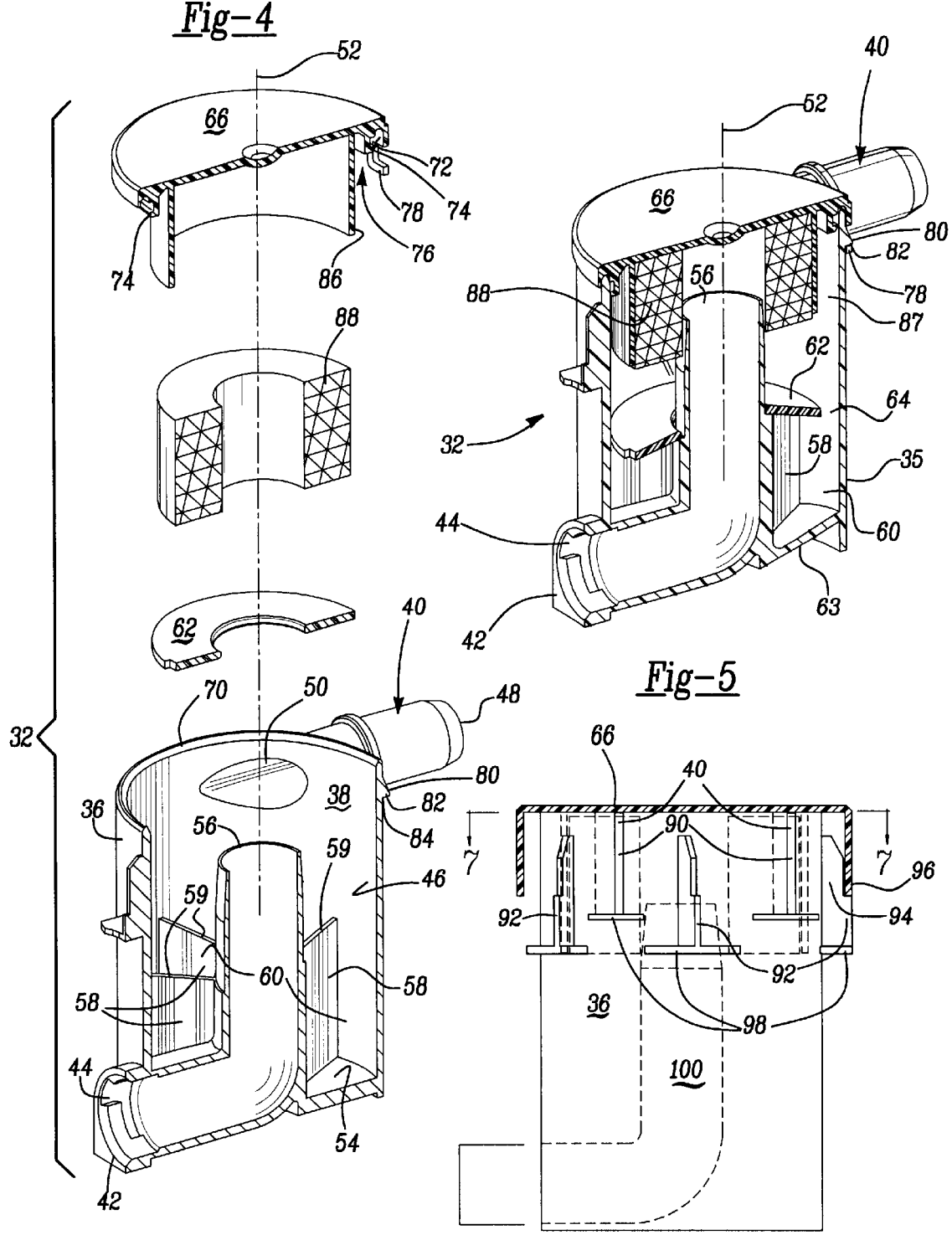

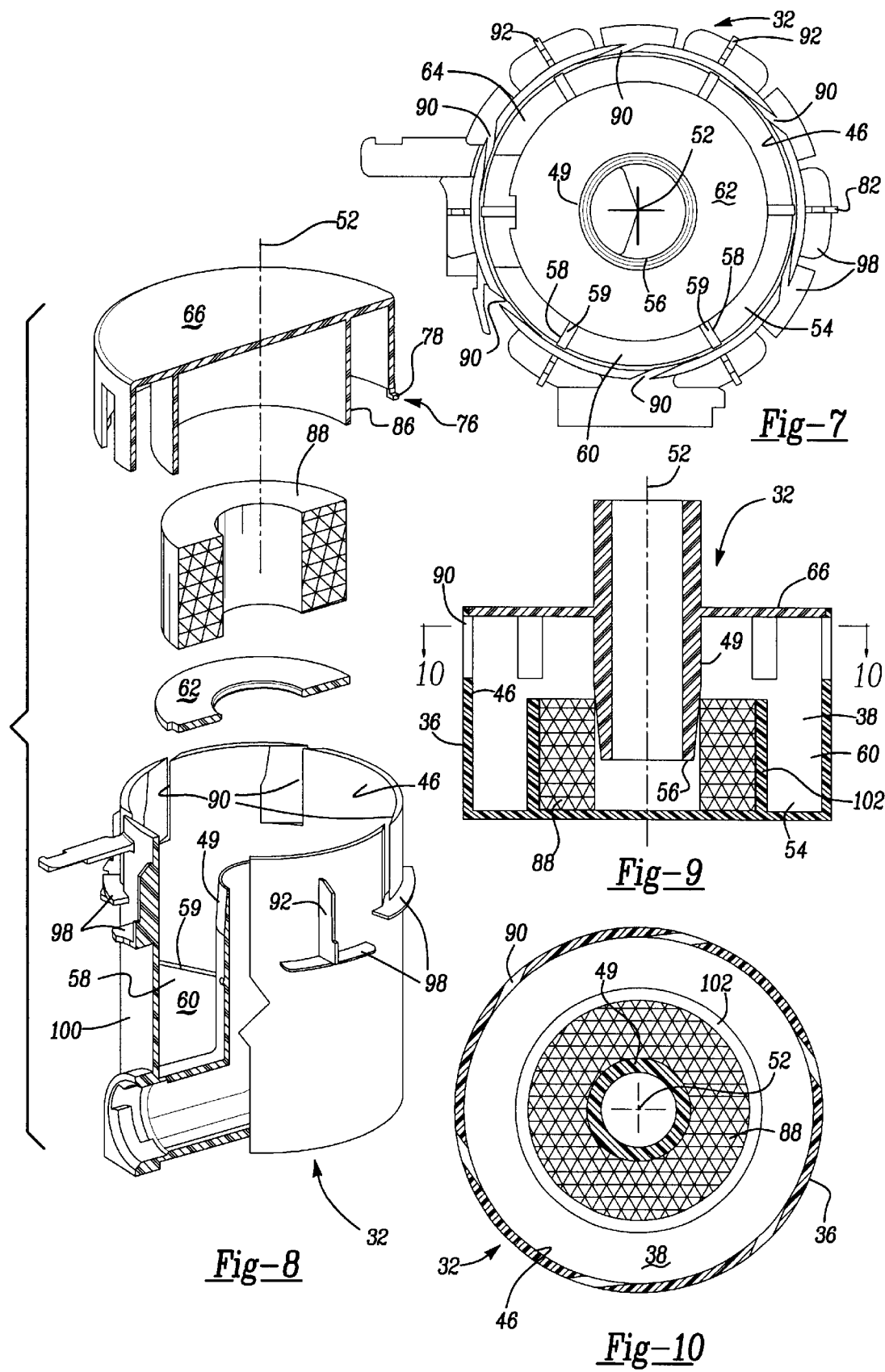

FILTRATION DEVICE FOR USE WITH A FUEL VAPOR RECOVERY SYSTEM

BACKGROUND OF THE INVENTION

1. Field of the Invention

The present invention relates generally to a filtration device used to remove contaminants, typically particulate matter or moisture from air used to purge a vapor canister. More specifically, the filtration device causes the air entering the device to flow along the inner circumference of a cylinder thereby generating an air stream having a sufficient flow velocity such that centrifugal force forces the contaminants against the side walls of the filter case whereafter they fall out of the air stream and collect in a low velocity cavity or dead air space.

2. Description of the Related Art

Conventional motor vehicles, due to increased emission standards, typically include a fuel vapor recovery system. The fuel vapor recovery system includes a vapor or purge canister for receiving fuel vapors generated in the fuel tank. A fuel vapor absorbent, typically activated charcoal, located in the vapor canister retains the fuel vapor when the vapors are displaced from the fuel tank during refilling. During operation of the engine, the fuel vapor contained in the vapor canister is purged by drawing fresh air through the canister and into the intake manifold of the engine.

Some fuel vapor recovery systems include a filtration device to filter the fresh air introduced into the canister during the purge operation. Filters used in the past include a foam filter placed in a rectangular box. However, water tends to pass through the foam filter and into the canister which reduces the effectiveness of the absorbent or charcoal. Also, dust or other contaminants build up on the foam filter and clog the filter which further reduces its efficiency.

Thus, it is desirable to have a low cost, low maintenance filtration device that does not require a complex, self-cleaning apparatus to filter the fresh air supplied to the vapor recovery canister.

SUMMARY OF THE INVENTION

Accordingly, the present invention provides a filtration device for use with a fuel vapor recovery system of the type using a vapor storage canister. The filtration device includes a housing defining a chamber. The chamber includes an interior surface. Air enters the chamber through an inlet port formed on the interior surface of the chamber. Air entering the chamber swirls within the chamber in a circular or cyclonic motion whereby particulate matter or moisture of sufficient mass contained in the air is forced against the interior surface of the chamber. These particulates then fall downward along the interior surface and ultimately into a debris collection bin. During the purge process, clean air is drawn from the chamber through an outlet port positioned in the center of the chamber.

The filtration device may also include a secondary filter, such as a foam filter element, that further filters the purge air before it is drawn into the vapor canister. The particles fall into the debris collection bin or dead air space, which may include a top that reduces the likelihood that particulate material or moisture will splash upwardly and enter the outlet passage.

Accordingly, the present invention provides a filtration device for effectively removing, through the use of centrifugal force along with gravity or a secondary flow pattern, particulate matter and moisture from air used to purge a vapor canister. While shown herein used with a vapor canister, the present invention may also be used with other devices requiring a supply of filtered air. Other features and advantages of the present invention will be readily appreciated as the same becomes better understood after reading the subsequent description taken in conjunction with the accompanying drawings.

BRIEF DESCRIPTION OF THE DRAWINGS

FIG. 1 is a schematic view of a vapor recovery system for use with an internal combustion engine utilizing a filtration device according to the present invention.

FIG. 2 is a top, sectional view of the filtration device shown in FIG. 1 taken along lines 2—2, with portions removed for clarity.

FIG. 3 is a sectional, perspective view of the filtration device for use with a fuel vapor recovery system in accordance with the present invention.

FIG. 4 is an exploded, sectional, perspective view of the filtration device shown in FIG. 3.

FIG. 5 is a sectional, perspective view of a second embodiment of a filtration device for use with a fuel vapor recovery system in accordance with the present invention.

FIG. 6 is a side view of a third embodiment of a filtration device for use with a fuel vapor recovery system in accordance with the present invention with portions removed for clarity.

FIG. 7 is a top view of the filtration device shown in FIG. 6 with portions removed for clarity.

FIG. 8 is an exploded, sectional, perspective view of the filtration device shown in FIG. 6.

FIG. 9 is a side sectional view of a fourth embodiment of a filtration device for use with a fuel vapor recovery system in accordance with the present invention.

FIG. 10 is a top, sectional view of the filtration device shown in FIG. 9 taken along lines 10—10.

DETAILED DESCRIPTION OF THE PREFERRED EMBODIMENT

Referring now to the drawings, FIG. 1 schematically illustrates a filtration device, seen generally at 8, used with a fuel vapor recovery system of the type used in an automotive vehicle. Automotive fuel systems typically include a fuiel tank 10 that stores fuel for use with an engine 12. A throttle valve 14 adjacent an intake passage 16 controls the amount of intake air supplied to the engine 12. Fuel is supplied to the engine 12 from the fuel tank 10 through a fuel supply line 18 and unused fuel is returned to the fuel tank 10 through fuel return line 20. It should be appreciated by those skilled in the art that a fuel system having no fuel return line 20 may also be used.

During operation of the engine 12, at elevated temperature, and during refueling of the fuel tank 10, fuel vapors are formed in the fuel tank 10. A typical vapor recovery system includes a fuel vapor vent line 22 used to vent fuel vapor from the fuel tank 10. Thus, when fuel enters the fuel tank 10 during the refueling operation, any fuel vapor exiting the fuel tank 10 is directed through the fuel vapor vent line 22 to a vapor storage canister 24. The vapor storage canister 24 is filled with an absorbent material, typically activated charcoal, that absorbs the fuel vapor.

Periodically, the fuel vapors are purged to refresh the vapor storage canister 24. During the purging process, fuel vapor stored in the vapor storage canister 24 is drawn through a purge line 26 into the intake passage 16. Wvhen the engine 12 is operating, the intake passage 16 operates at a negative pressure, thus the fuel vapors stored in the vapor storage canister 24 are drawn into the intake passage 16. Flow from the vapor storage canister 24 to the intake passage 16 is typically controlled by a solenoid valve 28. The solenoid valve 28 is positioned in the purge line 26 and is connected to and receives an operating signal from an engine control unit (not shown). In this way, the engine control unit operates to control the amount of fuel and air supplied to the engine 12 to achieve the proper stoichiometric ratio for efficient combustion.

In order to purge the vapor storage canister 24, fresh air is drawn into the vapor storage canister 24 through a fresh air inlet 30 located on the vapor storage canister 24. Typically, a filter 32 is placed on or adjacent the fresh air inlet 30 and is used to filter the fresh air to remove any dirt, dust and water prior to the air being introduced into the vapor storage canister 24. Depending upon the location of the vapor storage canister 24 and the filter 32 on the vehicle, a fresh air line 34 may be used to transport the clean or filtered air to the vapor storage canister 24. It is evident that while the filter 32 is shown separated from the vapor storage canister 24, the filter 32 may be placed adjacent, connected to, or formed internal with the vapor storage canister 24, thus eliminating the need for a fresh air line 34. Some systems place the vapor storage canister 24 adjacent, connected to or internal with the fuel tank 10.

In many instances, a canister vent solenoid 33 is used to close the fresh air line 34 during a system leak check. Typically, the filter 32 is used with the canister vent solenoid 33. However, such use is not always necessary. Additionally, the canister vent solenoid 33 can be incorporated into the filter 32, typically when the filter 32 is formed as part of the vapor storage canister 24.

Turning now to FIGS. 2–4, a filter 32 according to one embodiment of the present invention is shown. The filter 32 includes a housing 36 having an outer surface 37. The housing 36 defines a chamber 38. When the filter 32 is formed as part of the vapor storage canister 24, the housing 36, instead of being a separate member as shown herein, may be an integral part of the overall configuration of the vapor storage canister 24. Thus, as used herein, the term "housing" means a structure that defines, in whole or in part, the chamber 38. It is apparent that any structure used to form the chamber 38 is the housing 36 as used herein.

The filter 32 further includes an inlet 40 and an outlet 42. The outlet 42 is formed with a twist and lock style connector 44 to provide easy attachment to the fresh air line 34 or canister vent solenoid 33. It will be apparent that when positioned separate from the vapor storage canister 24, various types of attachment mechanisms may be used to connect the filter 32 to the fresh air inlet 30 of the vapor storage canister 24, including use of a nipple over which a hose may be clamped instead of the twist and lock style connector 44 shown herein. Further, a hose may also be attached to the inlet port 40 to vary the overall position of the air intake.

As shown in FIGS. 2–4, the chamber 38 includes a cylindrically-shaped interior surface 46. While shown herein as cylindrical, the chamber 38 and corresponding interior surface 46 thereof could be conical or some other combination of shapes designed to achieve a particular air flow pattern within the chamber 38. The function of the chamber 38 is to direct the air entering the chamber 38 through the inlet 40 in a particular flow pattern designed to force any particulate matter, moisture or other contaminants against the side walls or interior surface 46 of the chamber 38. This enables clean or filtered air to be removed from the interior or center 47 of the chamber 38 while the contaminants are forced outward, away from the outlet port 56.

The inlet 40 defines an inlet passage 48 that intersects with the interior surface 46 to define an inlet port 50. The inlet passage 48 is positioned tangential to the cylindrical interior surface 46. FIG. 4 illustrates that such an arrangement results in an oblong or oval-shaped inlet port 50. The chamber 38 also includes a rotational axis 52 about which the air entering the chamber 38 rotates. As shown herein, the rotational axis 52 coincides with the vertical or longitudinal axis of the chamber 38. Such an orientation is not always required. Depending upon the desired flow pattern, the axis of rotation 52 may be oriented in any number of positions. When the axis of rotation 52 coincides with the vertical or longitudinal axis of the chamber 38, and the inlet passage 48 is positioned substantially perpendicular to the longitudinal axis, no vertical or downward component of force is delivered to the chamber 38 by air entering the chamber 38 through the inlet passage 48.

In accordance with a further aspect of the invention, the inlet passage 48 may be positioned at an angle with respect to the interior surface 46 to provide a change or variation in the vertical force or component of the air entering the chamber 38. In the present invention, as air enters the chamber 38 it rotates within the chamber 38 in a circular or cyclonic motion. The centrifugal force created by the air rotating within the chamber 38 forces the contaminants carried in the air stream against the interior surface 46. The contaminants, either by gravity or a secondary flow pattern producing a downward flow, are forced to a collection or lower portion 35 of the housing 36 where a low velocity cavity or dead airspace 54 exists. As shown, the low velocity cavity 54 exists below the outlet port 56 of the outlet passage 49. Pursuant to the invention, the contaminants fall out of the circular or cyclonic air stream and collect in the collection portion 35 of the chamber 38. The clean or filtered air is then drawn out of the chamber 38 through the outlet port 56 located at or near the axis of rotation 52 of the chamber 38, i.e., along the vertical or longitudinal axis. The outlet port 56 is not required to be positioned coincident or at the axis of rotation 52 of the chamber 38. Ultimately, it may be spaced from the axis of rotation, depending upon the flow pattern of the air in the chamber 38.

As set forth above, the housing 36 includes a collection portion 35 formed by a low velocity cavity or dead air space 54 that collects the contaminants as they are removed from the air stream. The collection portion 35 includes a plurality of vertical side walls 58 that divide the collection portion 35 into a plurality of bins 60 into which the contaminants are collected. The purpose of the vertical side walls 58 shown herein is to stop the circular or cyclonic flow of the air within the chamber 38 to create the dead air space 54 in the collection portion 35. It should be evident that any other type of baffle system or arrangement that creates a dead air space in the collection portion 35 is also within the scope of the invention. For instance, the side walls 58 do not need to be continuous, nor do they need to be vertical.

A lid 62 is placed on the upper surface or edge 59 of the side walls 58. As shown, the lid 62 does not extend all the way to the interior surface 46 of the chamber 38. The purpose of the lid 62 is to contain the contaminants within the bins 60 while allowing entry of the contaminants into the bins 60. Accordingly, the lid 62 is sized such that it leaves a gap 64 between the interior surface 46 of the chamber 38 and the lid 62 through which the contaminants travel.

Conversely, the lid 62 may extend all the way to the arcuate interior surface 46 if the lid 62 includes openings or holes therein to allow communication between the collection portion 35 of the housing 36 and the chamber 38, for the purpose of allowing the contaminants removed from the air stream to be trapped in the bins 60. Pursuant to the invention, various types of openings such as slots, grooves, ducts or other passages that direct the contaminants into the collection portion 35 are also suitable. It should be appreciated that the purpose of the lid 62 is to trap contaminants within the bins 60, thus, any structure that performs such a function is within the scope of the present invention.

It should be appreciated that as shown in FIG. 5, the bins 60 may have a conical bottom 63, that is tapered inwardly toward the rotational axis 52 which, as shown herein, coincides with the vertical or longitudinal axis of the chamber 38. Tapering the collection portion 35 of the chamber 38 in this manner moves the collected contaminants toward the vertical or longitudinal axis of the chamber 38 either through gravity or vibration forces when the vehicle is operating and under the lid 62. Further, as shown in FIG. 5, the lid 62 may also be formed in a conical shape to further direct any contaminants toward the gap 64 between the lid 62 and the interior surface 46 of the chamber 38.

The filter 32 further includes a cap 66 that attaches to the top 68 of the housing 36. As shown in FIG. 2, the cap 66 includes a groove 72 and a lip 74. The upper edge 70 of the housing 36 is disposed within the groove 72 wherein the lip 74 engages the interior surface 46 of the chamber 38 to provide a seal between the cap 66 and the housing 36. The cap 66 is held in place by a detent mechanism 76 having a finger 78. During installation of the cap 66 on the housing 36 the finger 78 is urged outwardly by a ramp surface 80 of a locking projection 82. When the cap 66 is fully installed on the housing 36, the finger 78 travels past the ramp surface 80 and snaps into place underneath a shelf or locking surface 84 of the locking projection 82. Another way of attaching the cap 66 to the housing 36 is to use sonic welding or spin welding. In keeping with the invention, there are other options known to individuals skilled in the art for attaching, securing and sealing the cap 66 to the housing 36.

In keeping with the invention, the cap 66 further includes a barrier wall 86 that extends from the cap 66 inwardly into the chamber 38. The barrier wall 86 cooperates with the interior surface 46 of the chamber 38 to form a toroidal shaped region 87 in the chamber 38 that encourages an initial circular or cyclonic pattern of the air entering the chamber 38 through the inlet port 50. Additionally, the barrier wall 86 helps to force the air downward toward the collection portion 35 formed by the low velocity cavity or dead air space 54 as the air flows around the barrier wall 86.

The filter 32 may also include a secondary filter element 88 such as a foam-style filter to provide additional filtration of any contaminants not removed by the centrifugal force of the air stream rotating in the chamber 38. While shown as a foam filter, the secondary filter element 88 may be made of paper or any other filter material that filters contaminants from the fluid. It is not necessary to use a secondary filter element 88. However, if one is used, it should be oriented such that during back flow any contaminants captured will be released from the secondary filter element 88 and fall onto the lid 62 and subsequently into the bins 60. Back flow results when the fuel tank 10 is filled and the fuel vapor is vented through the vapor storage canister 24 such that air is displaced from the vapor storage canister 24 outward through the filter 32.

The outlet passage 49 in FIG. 3 is shown extending downwardly and out the bottom of the housing 36. FIGS. 9 and 10 show the outlet passage 49 may also be oriented such that it extends outwardly through the cap 66. It is evident that the outlet passage 49 and ultimately outlet port 56 should be placed along the rotational axis 52 of the chamber 38 as the contaminants are forced outward away from the center of the chamber 38. Additionally, placing the outlet passage 49 as set forth above causes the least interference with the circular or cyclonic motion of the air stream formed in the chamber 38. In addition, should a secondary filter element 88 be used, it may be mounted within the outlet passage 49 or between the outlet port 56 and the lower end of the chamber 38. In operation, a receptacle or holder 102 may be secured to the lower portion of the chamber 38 to secure the secondary filter element 88. The secondary filter element 88 is of a size less than that of the chamber 38 in order to create a low velocity cavity or collection portion 35 to collect the contaminants.

In operation, atmospheric air containing contaminants such as particulate matter or moisture is drawn into the chamber 38 of the filter 32 through the inlet passage 48. As the inlet passage 48 is positioned tangential to the interior surface 46 of the chamber 38, air entering the chamber 38 engages the interior surface 46 thereof and is caused to move in a circular or cyclonic motion. Such circular or cyclonic motion results in a centrifugal force that forces the contaminants against the interior surface 46, wherein they are then forced, either by gravity or a secondary flow pattern producing a downward flow, toward the collection portion 35 of the chamber 38 formed by a low velocity cavity or dead airspace 54. Bins 60 collect the contaminants. The air stream is urged inward toward the center of the chamber 38 as additional air continues to flow into the chamber 38. Filtered air is removed through the outlet port 56. When used, the secondary filter element 88 is positioned such that the air stream must pass through the secondary filter element 88 prior to being drawn out of the chamber 38 through the outlet port 56. Thus, clean, filtered air is used during the purge process to purge the fuel vapors from the vapor storage canister 24.

Shown in FIGS. 6–8 is a second embodiment of the present invention wherein the inlet 40 is formed of a plurality of slots 90 cut into the housing 36. As shown in FIG. 7, the slots 90 are oriented tangential to the interior surface 46 of the chamber 38. As set forth in the previous embodiment, the air enters into the chamber 38 in a direction tangential to the interior surface 46 and thus flows within the chamber 38 in a circular or cyclonic motion. The cap 66 is supported on the housing 36 by a plurality of outwardly extending ribs 92. The ribs 92 act as spacers to provide a gap 94 between the downwardly extending flange portion 96 of the cap 66 and the housing 36. The detent mechanism 76 is similar to that used in the previous embodiment and includes the finger 78 and the locking projection 82 to secure the cap 66 to the housing 36. A plurality of outwardly extending baffles 98 are placed on the outer surface 100 of the housing 36. The baffles 98 are staggered in their arrangement on the outer surface 100 of the housing 36 to provide a tortuous path for air entering the filter 32 through the gap 94 and ultimately through the slots 90 into the chamber 38. Providing a tortuous path helps to keep foreign matter such as mud, water, dust, debris and other pollutants from entering the filter during operation of the vehicle.

In operation, air is drawn into the chamber 38 through the slots 90 in the housing 36. As the slots 90 extend in a direction tangential to the interior surface 46 of the chamber 38, the air, upon entering the chamber 38, moves in a circular or cyclonic motion which forces particulate matter, contaminants or moisture of sufficient mass against the interior surface 46 of the chamber 38 where gravity or a secondary flow pattern producing a downward flow forces them into the bin 60. Once again, the filtered air is drawn out through an outlet port 56 and is used to purge the vapor storage canister 24.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described, and still be within the scope of this invention.

We claim:

1. A filtration device for filtering air used with a fuel vapor recovery system, the filtration device comprising:
   a housing having an upper end and a lower end, said housing defining a chamber, said chamber having an arcuate interior surface;
   an air inlet associated with said chamber such that said inlet intersects with said arcuate interior surface to form an inlet at the intersection of said inlet and said arcuate interior surface, said air inlet oriented such that air entering said chamber through said air inlet strikes said arcuate interior surface, wherein said arcuate interior surface redirects the flow of the air causing it to rotate in said chamber about a rotational axis wherein the centrifugal force of the rotating air filters out contaminants contained therein;
   an air outlet for removing filtered air, said air outlet positioned within said chamber and including an outlet port positioned at one of the following positions, coincident with and spaced from, the rotational axis of the chamber;
   said housing further including a barrier wall, said barrier wall extending into said chamber and spaced from said arcuate interior surface such that a gap is formed between said barrier wall and said arcuate surface, said barrier wall extending into said chamber to a position past the outlet port wherein air entering said chamber must flow past an end of said barrier wall and then through a gap formed between said barrier wall and said outlet passage prior to exiting said chamber through said outlet port.

2. A filtration device as set forth in claim 1 wherein said chamber includes a collection portion including a low velocity cavity, said collection portion formed below the outlet port.

3. A filtration device as set forth in claim 1 including a cap positioned on said upper end, wherein said barrier wall is attached to said cap and extends inwardly into said chamber when said cap is positioned on said upper end.

4. A filtration device as set forth in claim 1 including a secondary filter element disposed between said inlet port and said outlet port.

5. A filtration device as set forth in claim 3 wherein said cap includes a lip, said lip engaging said interior surface of said chamber to form a seal between said cap and said housing.

6. A filtration device as set forth in claim 1 including a secondary filter element positioned in said gap formed between said barrier wall and said outlet passage.

7. A filtration device as set forth in claim 2 wherein said collection portion is formed below said outlet port and contains at least one bin for receiving contaminants removed from the air entering the chamber, said bin formed by at least one side wall extending upward from the lower end of said chamber.

8. A filtration device as set forth in claim 7 including a lid positioned on top of said bin, said lid having at least one opening therein to allow communication between said flow portion and said collection portion.

9. A filtration device as set forth in claim 7 including a lid positioned on top of said bin, said lid being of a size less than the size of said chamber such that a gap is formed between an outer edge of said lid and said arcuate interior surface of said chamber through which contaminants pass to enter said bin.

10. A filtration device as set forth in claim 2 wherein said collection portion includes a bin adjacent to said gap between said barrier wall and said arcuate surface, said bin receiving contaminants removed from air entering said chamber.

11. A filtration device as set forth in claim 1 wherein said air inlet is formed by at least one slot located in said housing, said slot forming an opening between an outer surface of said housing and said arcuate interior surface of said chamber.

12. A filtration device as set forth in claim 11 wherein said housing includes a plurality of outwardly extending flange members spaced on the outer surface of said housing, said flange members cooperating with a downwardly extending flange member spaced from said outer surface to form a path for air entering said chamber through said slot.

13. A filtration device as set forth in claim 1 wherein said air inlet is formed by at least one tubular member connected to said housing, said tubular member intersecting said chamber to form said inlet port.

14. A filtration device as set forth in claim 1 wherein said air outlet extends downward into said chamber form said upper end of said housing; and a filter element positioned adjacent the outlet port of said air outlet.

15. A filtration device as set forth in claim 14 including a barrier wall extending upward from said lower end of said housing, and spaced from said arcuate inner surface to form a collection portion including a low velocity cavity.

16. A filtration device for filtering air for use with a fuel vapor recovery system, the filtration device comprising:
   a housing, said housing having a longitudinal axis and an arcuate interior surface and an upper end and a lower end, said chamber further including a flow portion and a collection portion, said flow portion adjacent said upper end and said collection portion adjacent said lower end;
   an air inlet associated with said chamber such that said inlet intersects with said arcuate interior surface to form an inlet port at the intersection of said inlet and said arcuate interior surface, said air entering said chamber through said air inlet is directed in a direction tangential to said arcuate interior surface wherein as said air strikes said arcuate interior surface, said arcuate interior surface redirects the flow of said air causing it to rotate in said chamber about said longitudinal axis wherein the centrifugal force of the rotating air filters out contaminants contained therein;
   an air outlet for removing filtered air, said air outlet positioned within said chamber and including an outlet port positioned along the longitudinal axis of the chamber; and a cap positioned on said upper end, said cap including a barrier wall attached thereto and extending inwardly into said chamber, said barrier wall spaced from said interior surface such that a gap is formed between said barrier wall and said interior surface, said barrier wall extending inwardly into said chamber to a position below said outlet port.

17. A filtration device as set forth in claim 16 including a secondary filter element disposed between said inlet port and said outlet port.

18. A filtration device as set forth in claim 17 wherein said secondary filter element is positioned in an annular gap formed between said barrier wall and said outlet passage.

19. A filtration device as set forth in claim 16 wherein said air inlet is formed by at least one slot located in said housing, said slot forming an opening between an outer surface of said housing and said arcuate interior surface of said chamber.

20. A filtration device as set forth in claim 16 wherein said collection portion is below said outlet port and contains at least one bin for receiving contaminants removed from the air entering the chamber, said bin including at least one side wall extending upward from the lower end of said chamber; and a lid positioned on top of said bin, said lid of a size less than the size of said chamber such that a gap is formed between an outer edge of said lid and said arcuate interior surface of said chamber through which contaminants pass to enter said bin.

21. A filtration device as set forth in claim 20 wherein said collection portion is below said outlet port and contains at least one bin for receiving contaminants removed from the air entering the chamber, said bin including at least one side wall extending upward from the lower end of said chamber; and a lid positioned on top of said bin, said lid having an opening therein to allow communication between said flow portion and said collection portion of said housing.

22. A filtration device as set forth in claim 16 wherein said housing includes a plurality of outwardly extending flange members spaced on the outer surface of said housing, said flange members cooperating with a downwardly extending flange member formed on said cap to form a path for air entering said chamber through said slot.

23. A filtration device for filtering air for use with a fuel vapor recovery system, the filtration device comprising:

a housing, said housing having a rotational axis and an arcuate interior surface and an upper end and a lower end, said chamber further including a flow portion and a collection portion, said flow portion adjacent said upper end and said collection portion adjacent said lower end, said collection portion including at least one bin for receiving contaminants, said bin including at least one side wall extending upward from said lower end of said chamber;

an air inlet associated with said chamber such that said inlet intersects with said arcuate interior surface to form an inlet port at the intersection of said inlet and said arcuate interior surface, said air entering said chamber through said air inlet is directed in a direction tangential to said arcuate interior surface wherein as said air strikes said arcuate interior surface, said arcuate interior surface redirects the flow of said air causing it to rotate in said chamber about said rotational axis wherein the centrifugal force of the rotating air filters out contaminants contained therein;

an air outlet for removing filtered air, said air outlet positioned within said chamber and including an outlet port positioned at one of the following positions, coincident with and spaced from the rotational axis of the chamber; and a cap positioned on and closing said upper end, said cap including a barrier wall attached thereto and extending inwardly into said chamber, said barrier wall spaced from said interior surface such that a gap is formed between said barrier wall and said interior surface, said barrier wall extending inwardly into said chamber to a position below said outlet port wherein air entering said chamber must flow downwardly past an end of said barrier wall and then upwardly through said gap formed between said barrier wall and said outlet passage prior to exiting said chamber through said outlet port.

24. A filtration device as set forth in claim 23 including a secondary filter element positioned in said gap formed between said barrier wall and said outlet passage.

25. A filtration device as set forth in claim 23 wherein said arcuate interior surface is cylindrically shaped.

26. A filtration device as set forth in claim 23 wherein said air inlet is formed by at least one slot located in said housing, said slot extending along said housing and forming an opening between an outer surface of said housing and said interior surface of said chamber.

27. A filtration device as set forth in claim 23 wherein said housing includes a plurality of outwardly extending flange members spaced on said outer surface of said housing, said flange members cooperating with a downwardly extending flange member formed on said cap to form a path for air entering said chamber through said slot.

28. A filtration device as set forth in claim 23 wherein said air inlet is formed by at least one tubular member connected to said housing, said tubular member intersecting said chamber to form said inlet port.

* * * * *